Jan. 25, 1966  V. F. MICHAEL  3,231,442
METHOD AND APPARATUS FOR FORMING GLASS-REINFORCED RESIN PIPE
Original Filed Jan. 23, 1961  2 Sheets-Sheet 1
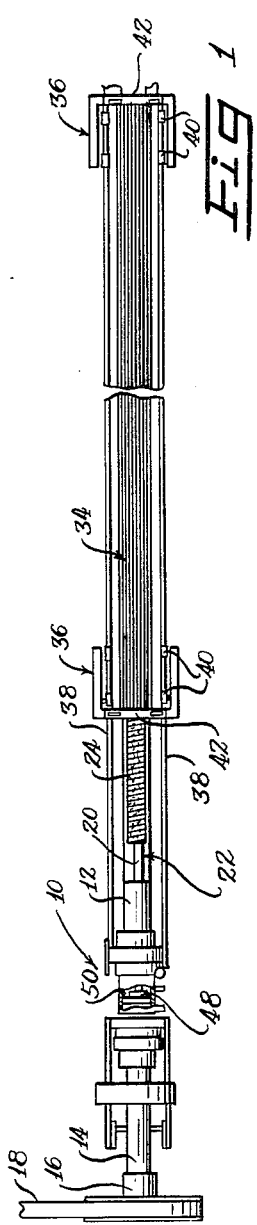
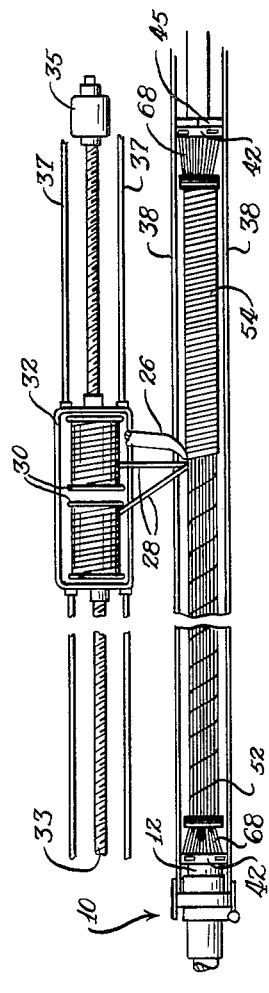
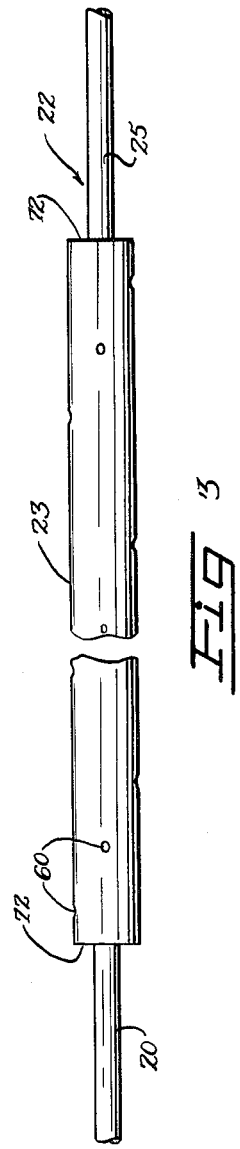
INVENTOR.
Vesta F. Michael
BY
Olson, Mecklenburger, von Holst,
Pendleton, Neuman Attys

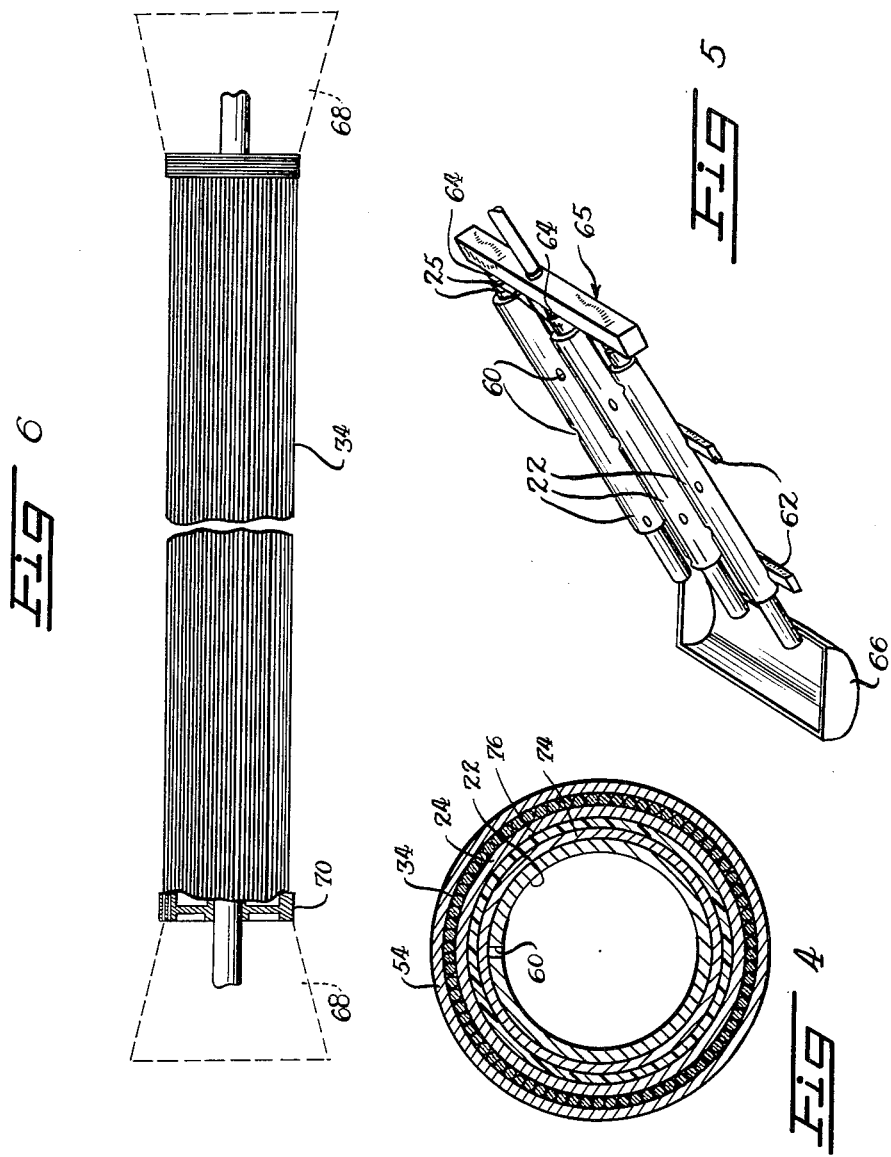

United States Patent Office 3,231,442
Patented Jan. 25, 1966

3,231,442
METHOD AND APPARATUS FOR FORMING
GLASS-REINFORCED RESIN PIPE
Vesta F. Michael, Wichita, Kans., assignor to Rock
Island Oil & Refining Co., Inc., Wichita, Kans., a corporation of Kansas
Filed June 18, 1962, Ser. No. 203,386
15 Claims. (Cl. 156—155)

This invention relates to a novel mandrel construction and more particularly pertains to a mandrel for use in the formation of a glass-reinforced plastic pipe and method for using the same.

In my copending application Serial No. 84,069 filed January 23, 1961, a process for forming a glass-reinforced plastic pipe on a rotatable mandrel is disclosed. In accordance with this process, layers of helically wound and and longitudinally extending glass roving are impregnated with a heat-curable resin during application to a rotatable pipe form or mandrel. Since the mandrel must be removed from the resulting assembly following completion of the pipe formation, means must be employed in the process of pipe formation between the mandrel and formed pipe to assure desired disengagement therebetween.

The separating means disclosed in my copending application Serial No. 84,069 comprises a paper liner helically wound about the mandrel, which liner is wax coated following application to the mandrel. After pipe completion the mandrel is removed from the liner and pipe assembly and the wax coating is melted in the course of a pipe post-curing step. In the course of the latter step the wax layer on the liner is melted and the glue securing the paper helices together dissolved, thereby allowing ready removal of the liner from the cured pipe interior.

Although the above-described separating liner is completely workable in the course of forming a glass-reinforced plastic pipe, it presents certain problems. Obviously, the paper liner is a factor which must be considered in ascertaining the total pipe cost. The wax also contributes to the manufacturing cost and similarly to the paper is only employed once and discarded. In addition to the cost of the paper and wax raw materials, the necessary processing steps necessitated by the application and removal of the waxed paper liner contribute to the manufacturing expense of the final pipe product.

The elimination of the paper liner in the formation of a glass-reinforced plastic pipe would, of course, enable the processing time and manufacturing cost of such pipe to be reduced.

It is an object of this invention, therefore, to provide a process for the formation of glass-reinforced plastic pipe which does not require the utilization of a discrete paper parting layer.

It is a further object of this invention to provide a novel mandrel construction for use in the formation of a glass-reinforced plastic pipe which enables wax employed as a parting agent between the mandrel and completed pipe to be substantially completely recovered for reuse.

It is another object of this invention to provide a novel process for the formation of a glass-reinforced plastic pipe in which a wax parting layer is removed from a position adjacent the inner periphery of the formed pipe simultaneously with the expansion of a mandrel member thereby contributing to the efficiency of pipe manufacture.

It is still another object of this invention to provide a novel mandrel for use in the formation of glass-reinforced plastic pipe which is inexpensive to manufacture and which may be readily formed from hollow tubular mandrels of previously known construction.

The above and other objects of this invention will become more apparent from the following detailed description when read in the light of the accompanying drawing and appended claims.

In one embodiment of this invention a hollow tubular mandrel formed of aluminum or other metal having good sag-resistance and form-retaining properties, and also having a positive coefficient of linear and cubical expansion is provided. Radiating, in a preferably uniform manner, from the hollow center of the mandrel are a plurality of apertures which traverse the mandrel wall thickness. The aperture diameters are preferably $\frac{1}{32}$ to $\frac{3}{32}$ inch in diameter at the mandrel surface, or otherwise of such small cross-sectional dimension, whereby flow thereinto of a liquid parting layer which is uniformly coated about the mandrel periphery is prevented by the surface tension of the parting layer when in the liquid state in which applied. Following application of the wax layer, a layer of resin curable at a temperature below the wax melting point may be formed over the wax and cured.

A glass-reinforced plastic pipe formed from uncured resin-impregnated layers of glass roving is then formed over the initially-formed wax and cured resin layers. The formed mandrel and pipe assembly is then heated to cure the resin saturating the roving and to expand the mandrel whereby it expands both radially and longitudinally. Concomitantly with such expansion the wax parting layer is forced into the mandrel interior through the apertures therein. Since the innermost resin layer adjacent the mandrel has already been cured, and since the heat is applied to the pipe exterior, the mandrel and formed pipe will not adhere to each other as the wax layer is squeezed from between the pipe-mandrel interface. Other details of the pipe-forming process will hereinafter be described in greater detail.

For a more complete understanding of this invention, reference will now be made to the drawings wherein:

FIGURE 1 is a fragmentary top plan view of apparatus employed in making glass-reinforced plastic pipe;

FIG. 2 is a fragmentary top plan view similar to FIG. 1, illustrating in addition a movable platform for holding spools of glass-reinforcement which may be utilized in conjunction with the mandrel construction of this invention;

FIG. 3 is a fragmentary elevational view of one form of mandrel member made in accordance with the teachings of this invention;

FIG. 4 is an enlarged sectional view of a mandrel member made in accordance with this invention in assembled relationship with a glass-reinforced plastic pipe which has been formed thereon;

FIG. 5 is a perspective view illustrating mandrel members in combination with apparatus for passing steam through the hollow centers thereof for purposes of recovering wax employed in the course of forming a glass-reinforced plastic pipe; and FIG. 6 is an enlarged, fragmentary elevational view of a longitudinal strand assemblage anchored at opposed end portions to fastener rings abutting against opposite end portions of a mandrel member, one of the fastener rings being illustrated in section.

Referring now more particularly to FIGS. 1 and 2, apparatus adapted for use in the formation of a glass-reinforced plastic pipe is illustrated. This apparatus does not comprise any portion of this invention and, accordingly, is not shown in detail. This apparatus is also described in my copending application Serial No.

84,069, which is directed to a process and apparatus for the formation of glass-reinforced plastic pipe.

The apparatus 10 of FIGS. 1 and 2 resembles well known lathe constructions and comprises a rotatable collet 12, more clearly shown in FIG. 1, connected to a drive shaft 14. Shaft 14 is affixed to a drive pulley 16, which is driven by a belt 18, fragmentarily illustrated, which is in turn driven by a motor or other motive means, not illustrated. The collet 12 engages a reduced end portion 20 of a mandrel 22 made in accordance with this invention, more clearly seen in FIG. 3. A reduced mandrel end portion 25, also more clearly seen in the latter figure, is oppositely disposed to mandrel end 20.

In the normal course of pipe formation, glass roving is wound under tension about the periphery of mandrel 22 so as to form a continuous spiral layer, such as layer 24 illustrated in FIG. 1. Glass roving has been found to be particularly satisfactory for use in the formation of plastic pipe, since the individual glass filaments of the roving are in untwisted relationship and consequently any tensile stresses exerted on such filaments are reacted to with the complete tensile strength of the filaments. If the glass filaments were in twisted relationship, tensile stresses exerted thereon would effect cutting action between the filaments because of their twisted condition.

Simultaneously with the application of the glass roving, a heat curable resin in liquid form is applied to the roving so that the roving is saturated with resin upon application to the mandrel. A resin dispenser 26 is fragmentarily illustrated in FIG. 2. It is noted from this latter figure that resin may be dispensed onto roving strips 28 as the same are pulled from spools 30 mounted on platform 32. Platform 32 is reciprocally moved along the length of rotating worm 33 driven by reversible motor 35. Guide rods 37 assist in maintaining platform 32 in a desired horizontal position. The spools 30 are preferably rotated only with the exertion of a predetermined torque so as to assure roving application to the mandrel 22 under predetermined tension.

After a spiral layer, such as layer 24 of FIG. 1, has been applied to the mandrel, a layer of longitudinal roving strands may be applied thereover so as to impart to the final formed pipe desired tensile strength. It is obvious that although the spiral roving helices will impart good burst strength to the pipe in which incorporated, such helices will not impart any appreciable tensile strength.

Accordingly, longitudinal strand assemblages such as assemblage 34 of FIG. 1, may be placed about a mandrel and helical wrap 24 after formation of the latter wrap by being moved thereover by opposed trucks 36, which engage guide rails 38 by means of wheels 40. Anchor rings 42 engage the opposed end limits of the roving strands making up the assemblages 34. The rings 42 may be anchored to the rotatable collect 12 and a locking collar 45 in the manner most clearly seen in FIG. 2 for purposes of establishing a fixed relationship relative to the rotatable mandrel 22 and concentrically disposed spiral wrap 24 formed thereon.

After the horizontal strand assemblage 34 has been anchored to the rotatable collet 12 and collar 45 by means of locking bolts or the like, a pneumatic piston 48, illustrated in FIG. 1, disposed within cylinder 50 is actuated for purposes of moving collet 12 a predetermined distance from anchor ring 42 mounted on locking collar 45. As a result of this latter movement, the strands of the assemblage are placed under tension enhancing the strength of the ultimate pipe product since any tension exerted along the longitudinal axis of the final pipe may be reacted to by these prestressed longitudinal roving filaments.

After the assemblage anchor rings are locked in place and the roving filaments placed under tension, a spiral wrap of glass roving 52 is wound about assemblage 34.

It will be noted that the helices of wrap 52 may be spread apart a substantial distance from each other since the only purpose of this wrap is to bring the strands between the anchor rings 42 into engagement with the underlying spiral wrap 24.

Following application of wrap 52, a second continuous spiral wrap 54 is applied over longitudinal assemblage 34. As was the procedure with the application of spiral wrap 24, resin in a fluid state is simultaneously applied to the roving as it is wrapped about the assemblage 34. Sufficient resin is applied so that both the longitudinal and helical roving strands are completely impregnated with resin. Complete impregnation assures final pipe strength; desired impregnations may be assured by dispensing the resin in a sufficiently fluid condition at a sufficiently elevated temperature such as 150° F., so that the same may readily penetrate into the roving filament interstices.

It is apparent that the glass-reinforced resin pipe above described cannot be formed directly on the rotatable mandrel 22 since the uncured resin will tend to adhere to the external periphery of the mandrel. Therefore, a parting layer must be interposed between the outer periphery of the mandrel and the inner-peripheral surface of the formed pipe which will assure mandrel-pipe disengagement following completion of the pipe product.

It was found that if the glass-reinforced resin pipe were formed directly over a mandrel coated with a parting layer, such as wax, a defective pipe product would result. Upon application of curing heat to the uncured resin pipe employing such a wax layer, the mandrel would expand as a result of the heat forcing the wax to penetrate into the interior of the pipe. Such wax penetration materially weakened the pipe rendering the same defective.

In my copending application Serial No. 84,069 a wax coated paper liner was disclosed as the means for facilitating disengagement between the mandrel and the completed pipe. As previously pointed out, however, such wax coated paper liner added to the expense and processing time necessary for the completion of a glass-reinforced pipe formed on a mandrel in the manner above described.

By employing a mandrel, such as mandrel 22 fragmentarily illustrated in FIG. 3, a discrete paper liner adapted to carry a parting substance of relatively low melting point, such as wax, may be completely dispensed with. Mandrel 22 comprises a hollow tubular member formed of aluminum or other metal, providing the desired rigidity necessary for pipe formation. Mandrels made in accordance with the teachings of this invention should also possess positive coefficients of linear and cubical expansion so that upon applicaiton of heat thereto the mandrel will expand both axially and in cross section.

Since the glass-reinforced plastic pipe under consideration is formed from resin-impregnated roving in which the resin is in the uncured state, the resin must be cured following roving application to a mandrel member. Curing preferably is effected while the mandrel and pipe assembly are rotating so that the slightly fluid resin will be uniformly distributed around the assembly periphery. In the course of the curing operation, heat such as is imparted by heat-radiating lamps may be employed to effect the curing.

As the heat is applied, not only does the uncured resin assume its hardened cured state, but in addition the elevated temperatures imparted to the aluminum or other heat expansible material of composition from which the mandrel is made expands, further tensioning the glass strands disposed about the main enlarged tubular surface 23 of the mandrel 22.

It has been found that if a thin wax coating is applied to a mandrel, such as mandrel 22, and if the mandrel is apertured, as at 60, (see FIG. 3) in a substantially uniform manner, a paper parting layer may be eliminated. In the course of the resin-curing and mandrel-expanding steps, the wax covering interposed between the surface of mandrel portion 23 an the inner-most surface of the formed pipe will be forced into apertures 60 and pass into the central longitudinal opening passing through the tubular mandrel 22.

Thus, following the resin curing step, the wax interface between the mandrel and the formed pipe will be removed from the surface of the mandrel and pass into the mandrel interior. The wax disposed in the interior of the mandrel may then be removed by passing steam or other hot fluid through the mandrel members in the manner illustrated in FIG. 5. It will be noted from the latter figure that a plurality of mandrels 22 are maintained in an inclined position by supporting members 62. Nozzle portions 64 of a steam header 65 are snugly received in reduced terminal end portions of the mandrels, enabling steam to pass through the hollow center portions of the mandrels. Any wax which may be disposed in the mandrel interiors is melted and enabled to flow into trough 66, from which the wax may be recovered for reuse.

In the course of pipe formation, the wax coating initially applied to the mandrel surface may be very thin, such as $1/64$ to $1/32$ of an inch thick. Following application of this initial wax coating, a thin epoxy resin coating may be applied thereover and cured at room temperature. Thus, a cured resin coating is formed on the mandrel over the wax layer before any application of resin impregnated roving, which is applied under tension in the manner previously described in the discussion of FIGS. 1 and 2.

As a result of the formation of this original resin coating a pipe construction is assured in which no free ends of the roving spiral wrap penetrate into the pipe interior causing unraveling of the roving and premature pipe deterioration. The formation of an initially cured resin liner, therefore, helps to assure a smooth inner resin periphery free from projecting roving ends.

In a modified process for pipe formation, the initial thin cured resin layer may be eliminated. An initial roving layer may instead be applied directly over the solidified wax coating. Such layer comprises a longitudinal strand assemblage, the filaments of which have no tendency when applied to cut through the inner pipe peripheral wall. The pipe may then be built up by means of the resin-impregnated roving layers as above described.

Inasmuch as the initial resin liner, when employed, must be cured in a temperature range which will not effect melting of the underlying wax, the epoxy or other resin layer is applied in the form of a composition which will cure at slightly elevated temperatures below the melting point of the wax applied, which may be in the neighborhood of 150° F.

A composition which has been found very satisfactory for formation of this initial liner comprises 25 parts by weight of triphenyl phosphite, 100 parts by weight of epoxy resin, 12 parts by weight of triethylene tetramine, based on the weight of the epoxy resin, and 5 parts of a thixothropic agent, such as a silicate product marketed under the name Cab-O-Sil. The triphenyl phosphite accelerates resin curing so that the resin may cure at a rather low temperature and the triethylene tetramine comprises a resin hardner. Other resin compositions which will cure into a hard lining over the wax are, of course, suitable and it is apparent that those skilled in the art may readily employ a variety of compositions for forming such liner. Also, a pure wax melting at about 150° F. is given by way of example only as the parting agent for use with the mandrel 22. It is apparent that other parting agents which may be fluidized in the course of resin curing of the final pipe product may be employed to advantage in the process above disclosed.

The parting agents should have a "low" melting point, that is, the parting agent should melt upon the application of external curing heat to the pipe-mandrel assembly, but should not melt prior to substantial curing of the overlying resin portion of the pipe. Since the curing heat penetrates inwardly into the pipe interior, the resin will normally cure before the parting agent melts. Since the mandrel apertures allow ready removal of the wax, the wax may be removed from the mandrel-pipe interface without penetration of the wax into the pipe, even should the pipe resin not be completely cured. Those skilled in the art may readily ascertain those process curing heats workable with particular resins employed with a glass roving in a particular pipe composition. The parting layer need not be truly melted during pipe curing, but need only be flowable into the mandrel apertures in preference to penetrating into the pipe interior upon generation of the mandrel expansion forces.

The mandrel apertures 60 should have diameters no greater than that which will support a wax or other parting agent coating without allowing such coating to flow into the opening. That is, the cross-sectional area of the aperture 60 should be small enough so that the surface tension of the parting agent coated on the mandrel is sufficiently high to span the opening and form an effective cover thereover. Employing a pure wax composition having a melting point of about 150° F., the mandrel apertures may have diameters of approximately $1/32$ to $3/32$ inch. The apertures are preferably spaced uniformly about the pipe periphery.

An aperture design which has been found to be extremely effective comprises forming the apertures 60 in spiral form about the mandrel periphery so that the apertures of each spiral configuration are formed ninety degrees apart on the curved mandrel surface and axially advanced about two inches from the spiral aperture disposed closest thereto. As a result of such spacing, apertures in longitudinal axial alignment on the mandrel surface and disposed parallel to the longitudinal axis of the mandrel will be spaced eight inches from each other.

As previously described, after the wax coating and initial resin liner have been formed on the mandrel, resin-impregnated roving is applied to the liner until a pipe of desired dimensions and construction is formed. In the course of curing, as may be effected by infra red heating lamps which are trained on the mandrel pipe assemblies as the same rotate on a curing table, the mandrel will radially expand as a result of heat application placing the spiral roving strands under tension. Also, if the longitudinal strands of the longitudinal assemblages 34 are anchored to opposed end portions of the mandrel, these longitudinal strands will also be placed under tension in the course of mandrel expansion.

It will be noted from FIG. 2 that although opposed ends of assemblages 34 are anchored to rings 42, strand portions 68 interconnecting the roving strands disposed on the periphery of the mandrel and the anchor rings 42 must be cut following formation of a desired pipe member so as to separate the anchor rings 42 from the completed pipe assembly. This may be readily accomplished by merely holding a knife adjacent the strand portions 68 as the same rotate in the illustrated apparatus 10.

To assure anchoring of the longitudinal strands to the mandrel and pipe assembly after the assembly has been disengaged from anchor rings 42, fastener rings 70, one of which is more clearly seen in section in FIG. 6, are disposed adjacent end portions of the mandrel pipe-forming surface 23. The fastener rings abut against shoulders 72 (see FIG. 3) which define the planes wherein the reduced mandrel end portions join enlarged mandrel portion 23.

In the normal course of pipe formation, therefore, after longitudinal assemblages, such as assemblages 34, are placed over the initial spiral wrap, such as wrap 24 of FIG. 1, a plurality of spiral wraps are formed over each fastener ring 70 (see FIG. 6) in the manner illustrated in FIG. 2. Thus, positive retention of the longitudinal strands to the pipe-mandrel assembly following cutting of the longitudinal strand portions 68 is assured. In the normal course of pipe curing when the mandrel expands longitudinally, the longitudinal roving strands are securely anchored to the opposed rings 70. The longitudinal strands will be placed under uniform tension and the resin is cured with the longitudinal strands in this stressed condition. Following resin curing, the rings 70 and overlying resin impregnated roving may be cut from the main mandrel surface 23 and the pipe formed thereon.

It is seen, therefore, that a novel mandrel construction has been provided for forming glass-reinforced plastic pipe. The apertured mandrel construction in FIG. 3 dispenses with the need for a separate paper liner to prevent adherence between the mandrel and formed pipe. By way of specific example, a heated liquid wax coating, approximately 1/32 inch thick, is brushed on a rotating mandrel at room temperature and allowed to solidify. Following application of the wax layer, a resin composition such as the previously described composition adapted to form a thin liner is troweled onto the wax coated mandrel and allowed to cure at a temperature below the wax melting point of 150° F.

Following curing of the thin resin liner many spiral and longitudinal layers of resin impregnated glass roving strands are applied so as to give the desired pipe thickness. In an alternate method of pipe formation the resin liner is eliminated and a longitudinal roving assemblage positioned directly over the wax coating. This initial roving layer is thoroughly impregnated with resin to assure the absence of dry pockets within the glass filaments. As many spiral wraps are applied and as many longitudinal wraps are applied as it necessary to give the desired pipe burst strength and tensile strength. After a pipe of desired thickness is formed, the assembly is placed on a curing table in the manner described in my copending application Serial No. 84,069 and radiant heat applied to the assembly; by way of example, a curing temperature of from about 150° F. to 200° F. may be employed. In the course of heating, the mandrel expands and the wax layer initially applied to the mandrel liquefies and is forced into the mandrel center from which the wax may be recovered for reuse. If sufficient aperture volume is present in a mandrel construction radially disposed relative to the longitudinal mandrel axis, there is no need for a hollow mandrel center. Following pipe formation the wax or other parting layer which has flowed into the apertures may be removed by heating the mandrel as the same is rotated over a collecting pan.

In the course of mandrel expansion, the mandrel is able to occupy the volume previously occupied by the wax. FIG. 4 comprises a sectional view, illustrated on an enlarged scale, of a mandrel-pipe assembly following formation of the same. Mandrel 22 is innermost and one aperture 60 is illustrated in section. Disposed about the mandrel periphery is a wax layer 74 and disposed about layer 74, a thin resin liner 76.

A spiral roving layer 24 is formed over resin liner 76, a longitudinal roving layer 34 is illustrated in overlying relationship with wrap 24 and final spiral wrap 54 is illustrated as the outermost layer. As previously noted, the number of spiral and longitudinal wraps may vary and the cross section of FIG. 4 is given by way of example only.

The principles of this invention apply to the formation of any pipe formed at least in part from a heat curable resin on a mandrel or pipe form in which adherence of the formed pipe to the mandrel may create a problem.

It is seen, therefore, that a novel apertured mandrel construction has been provided which expands in the course of pipe curing and imparts desired tension to helical strands employed in the pipe.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. In a process for the formation of a glass-resin pipe the steps comprising coating a radially apertured pipe form having a positive co-efficient of expansion with a parting layer having a low melting point, applying under tension layers of glass roving impregnated with uncured heat-curable resin over said parting layer, applying heat to the resulting form-roving combination so as to cure said resin, expand said form and liquefy said parting layer; said parting layer being forced into the form apertures in the course of the expansion thereof.

2. In a process for the formation of a glass-resin pipe, the steps comprising coating a hollow, radially-apertured pipe form having a positive coefficient of expansion with a parting layer having a low melting point; applying under tension layers of glass roving impregnated with uncured heat-curable resin over said form, anchoring portions of said roving to spaced portions of said form, applying heat to the resulting form-roving combination so as to cure said resin, expand said form and liquefy said parting layers; said form being expanded before said resin cures whereby said resin may be cured while said roving is in a stretched condition as a result of said form expansion, said parting layer being forced into the form apertures in the course of said form expansion.

3. In a process for the formation of a glass-resin pipe the steps comprising applying a parting layer of low melting composition to an apertured rotatable pipe form having a positive coefficient of expansion, applying a first curable resin layer over said low-melting composition comprising said parting layer and adapted to obviate adhering of said resin layer to said piper form, curing said first resin layer, applying glass roving impregnated with uncured heat-curable resin over said first resin layer, anchoring said glass roving to spaced portions of said pipe form, applying heat to the resulting form-glass roving assembly so as to expand said form whereby said anchored roving its placed under tension, and then curing said uncured resin with said pipe form in the expanded condition.

4. In a proces for the formation of a glass roving-resin pipe the steps comprising coating an apertured tubular pipe form with a low melting point parting layer, applying resin-impregnated layers of glass roving impregnated with uncured heat-curable resin to said form, said glass roving being applied in helical and longitudinal layers arranged substantially transversely and parallel respectively to the longitudinal axis of said form, said layers being applied whereby the roving strands are maintained under tension, applying heat to the resulting form-glass roving assembly so as to radially and longitudinally expand said form whereby said parting layer is forced into the pipe form apertures.

5. In a process for the formation of a glass roving-resin pipe the steps comprising coating an apertured heat-expansible tubular form means with a parting layer having a melting point of about 150° F., applying resin-impregnated layers of glass roving impregnated with uncured heat-curable resin to said form, and applying a temperature of about 150° to 200° F. to the resulting form-glass resin combination so as to radially expand said form whereby said resin is cured and said parting layer is forced into said form apertures.

6. A mandrel construction for use in the formation of a glass-resin pipe comprising a tubular pipe form having a hollow center surrounded by a curvilinear wall and apertures radiating from said center through the pipe form wall, said pipe form being composed of a material having a positive coefficient of expansion; said apertures having diameters at the surface of said pipe form of between about 1/32 to 3/32 of an inch, said apertures being arranged in the form of spaced spirals about the periphery of said pipe form.

7. In a proces for the formation of a glass-reinforced resin pipe, the steps comprising coating a pipe form having apertures traversing the wall thereof with a parting layer flowable under compression, applying layers of glass roving impregnated with uncured resin which is heat curable over said pipe form until a pipe of desired dimensions is formed, applying sufficient heat to the resulting pipe form-pipe combination to expand said pipe form and cure said heat-curable resin; said heating curing said resin to an adequate degree prior to expanding said pipe form so that substantially all of said parting layer is forced into said pipe form apertures by the pressure exerted by said expanding pipe form on said parting layer against said pipe.

8. In a process for the formation of a pipe over a form from heat curable resin which adheres to said form in the uncured state, the improvement comprising forming the resin component of said pipe in the uncured state over an apertured heat-expansible pipe form coated with a parting layer flowable under pressure which prevents adhering of said uncured resin to said pipe form and then heat curing said heat curable resin applied to said pipe form, whereupon the parting layer is forced by the pressure exerted by the heat-expanded pipe form into the pipe form apertures rather than into said pipe interior in the course of curing the resin thereof.

9. In a process for the formation of a pipe formed at least in part from heat curable resin the steps comprising applying at least partially uncured heat curable resin to an apertured pipe form having a positive coefficient of expansion and coated with a parting layer flowable under pressure, said parting layer preventing adhering of said uncured resin to said form; applying heat to the exterior of the resulting pipe form-resin combination so as to concomitantly expand said pipe form and cure said resin; said pipe form having a greater coefficient of expansion than said resin whereby the heat expanded pipe form creates a pressure adequate to urge the parting layer to flow into said pipe form apertures, the pipe form apertures comprising a volume adequate to receive all of said parting layer.

10. The process of claim 9 in which said resin is sufficiently cured during expansion of said mandrel whereby said parting layer more readily flows into said apertures than into said pipe interior.

11. The process of claim 9 in which said parting layer flows into said apertures while at a temperature above its melting point.

12. The process of claim 9 in which said parting layer flows into said apertures while at a temperature below its melting point.

13. A coated form for use in the formation of a pipe comprising a form for said pipe covered with a parting layer hardenable at room temperature and flowable at elevated temperatures in excess of room temperature, said parting layer comprising a wax having a melting point of 150° F., said form having a plurality of apertures extending inwardly from the surface of said form; the surface dimensions of said form apertures being between 1/32 to 3/32 inch in diameter at the surface of said form whereby the surface tension of said parting layer prevents flow into said apertures when applied thereover at an elevated temperature in excess of room temperature in a flowable state.

14. In a process for the formation of a pipe member over a pipe form from a heat-hardenable material of composition which would normally adhere to said pipe form if placed directly thereon, the steps comprising coating an apertured, heat-expansible pipe form with a parting layer flowable under pressure and at those elevated temperatures adapted to cure said heat-hardenable material; forming a pipe member of the heat-hardenable material over said parting layer, and applying heat to said pipe member and said heat-expansible pipe form so as to harden the composition of the formed pipe member and expand said pipe form thereby reducing the available volume between said pipe form and said formed pipe member and forcing the parting layer therein to flow into the apertures of said pipe form.

15. In a process for the formation of a pipe over a pipe form from a heat-hardenable material of composition which would adhere to said pipe form if initially placed directly thereon in the unhardened condition, the steps comprising coating an apertured heat-expansible pipe form with a parting layer flowable at an elevated temperature which is suitable for curing said heat-hardenable material of composition; forming a pipe of heat-hardenable material and filamentous reinforcements under tension over said pipe form, said reinforcements being anchored to said pipe form; and applying heat to the pipe and heat-expansible pipe form so as to expand said pipe form and reduce the available volume between the said pipe form and pipe whereby the parting layer passes into the pipe form apertures as said pipe form expands; said formed pipe concomitantly hardening and said reinforcements being placed under additional tension in the course of applying said heat.

References Cited by the Examiner

UNITED STATES PATENTS

| | | |
|---|---|---|
| 1,765,572 | 6/1930 | Eichenberger. |
| 2,285,502 | 6/1942 | Dreyfus _____ 18—47 |
| 2,739,350 | 3/1956 | Lampman _____ 156—155 XR |
| 3,033,730 | 5/1962 | Martin _____ 156—175 XR |
| 3,068,133 | 12/1962 | Cilker et al. _____ 156—433 |
| 3,141,052 | 7/1964 | Labash _____ 264—317 XR |

FOREIGN PATENTS

| | | |
|---|---|---|
| 859,950 | 1/1961 | Great Britain. |

EARL M. BERGERT, *Primary Examiner.*